Sept. 15, 1959　　　M. J. IRLAND ET AL　　　2,904,450
TRANSPARENT COATING
Filed May 14, 1958
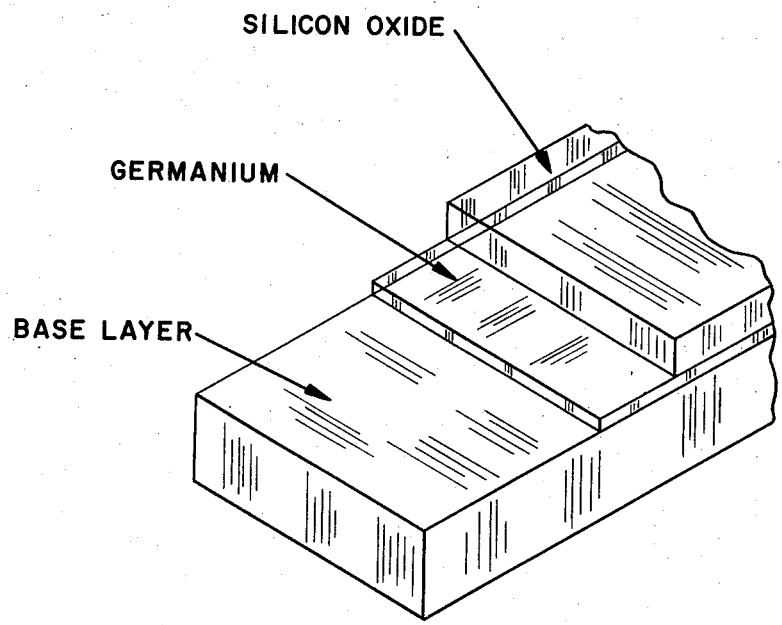
M. J. IRLAND
E. B. SCHERMER
INVENTOR.

United States Patent Office 2,904,450
Patented Sept. 15, 1959

2,904,450

TRANSPARENT COATING

Max J. Irland, Dearborn, and Eugene B. Schermer, Detroit, Mich., assignors to Ford Motor Company, Dearborn, Mich., a corporation of Delaware Application May 14, 1958, Serial No. 735,182

9 Claims. (Cl. 117—71)

This invention is concerned with the optical sciences and is more specifically directed to a coating capable of application upon a soft, transparent, translucent or opaque substrate to protect the surface of such substrate from scratches and similar mechanical abrasions. The optical art has long been aware of the possible economies in producing lenses and other optical components from readily moldable plastic materials which are inherently soft. While such lenses are optically acceptable they have had small commercial acceptance because of their inability to resist scratching.

This invention supplies a coating which may be readily applied to such soft and readily molded plastics to give a highly transparent or reflecting protecting layer which will impart to the plastic a scratch resistance of the same order as ordinary optical glass.

As can readily be seen from an inspection of the sheet of drawing, this coating comprises a layer of germanium and a layer of silicon oxide superimposed upon a base layer. For the sake of clarity of illustration, this drawing is not to scale in a vertical direction. However, the thickness of the germanium layer is much less than that of the silicon oxide layers.

The optical art is well aware of the benefits to be gained from the deposition of individual layers of germanium and of silicon oxide on optical surfaces and is further aware of methods whereby these coatings may be laid down. For the benefit of those who may not be familiar with the literature on this subject, attention is invited to the following citations:

(1) J. E. Tausz and M. Tausz: The Protective Coating of Mirrors with an Oxide of Silicon, FIAT Final Report No. 1103, Office of Military Government for Germany (U.S.), 1947.

(2) L. Holland: Vacuum Deposition of Thin Films; London, Chapman and Hall, 1956; p. 110.

(3) G. Hass and N. W. Scott: J. Opt. Soc. Am. 39, 179 (1949).

(4) G. Hass: J. Opt. Soc. Am. 45, 945 (1955).

While this invention may be applied to any soft optical surface, it is preferred to work with the plastic sheet material which is chemically a polymethylmethacrylate commonly known and merchandised as Plexiglas, Lucite, Perspex, etc. The thickness of the germanium layer may vary from a few Angstrom units up to 1000 Angstrom units without materially affecting the invention. The layer of the upper layer of silicon oxide may vary from 1000 Angstrom units to 20,000 Angstrom units or more. Beyond 20,000 Angstrom units these silicon oxide films are prone to crack, check or peel spontaneously. The preferred thickness is 2500 to 5000 Angstrom units.

A sheet of polymethylmethacrylate plastic one-eighth inch thick was stripped of its protecting paper, washed thoroughly in normal hexane and dried carefully by parallel strokes of a cotton swab. The specimen was then placed face down in a 14 inch vacuum coating unit which had previously been equipped with separate heating elements to evaporate separately germanium and a stoichiometric mixture of powdered silicon and silicon dioxide. This unit was pumped down to an absolute pressure of $10^{-5}$ mm. of mercury and the germanium evaporating filament energized. Evaporation of germanium was stopped when the transmission factor of the specimen to the light from a mercury vapor lamp had fallen to a value of approximately 72 percent from an initial value of 92 percent. The silicon oxide evaporating filament was then energized and the mixture of silicon and silicon dioxide heated to 1100° C. at which point an oxide of silicon of indefinite composition was formed and evaporated upon the polymethylmethacrylate sheet. It is preferred to admit into the vacuum chamber at this time a small stream of oxygen or atmospheric air, preferably in the immediate vicinity of the silicon oxide source. This results in the oxidation of the silicon oxide toward silicon dioxide and thereby yields a more transparent film. However, the vacuum must be maintained in the vicinity of $10^{-4}$ mm. mercury during this procedure.

Progress of the deposition of the silicon oxide is observed by means of the mercury vapor lamp and the coating interrupted when the transmission of the specimen has reached its second maximum. At such second maximum this specimen will have a transmission value of between 75 percent and 80 percent.

To test the resistance of the polymethylmethacrylate sheet so coated to abrasion a comparison was made of this sheet with the glass of an ordinary microscope slide and an identical uncoated polymethylmethacrylate sheet. This test which is necessarily arbitrary in nature comprised drawing a weighted disc 1½ inches in diameter and faced with felt across the specimen a given number of times. The strokes were all in the same direction. In the initial test the felt was saturated with 1200 mesh corundum (synthetic emery) grit and loaded to a total weight of 225 grams. In the second test the felt was saturated with 600 mesh grit and loaded to a total weight of 570 grams. The test comprised 40 complete strokes, each 1.4 inches in length.

|  | 1,200 grit, 225 gm. load | 600 grit, 570 gm. load |
| --- | --- | --- |
| Bare Plexiglas | 6.7 × 10⁻⁴ | 35 × 10⁻⁴ |
| Glass | .08 | 1.38 |
| Filmed Plexiglas | .15 | 0.15 |

The values presented in the table above represent the ratio between the amount of light scattered into a microscope objective from a beam of light impinged upon the surface in question at a grazing angle and the amount of light specularly reflected from such a surface when oriented with regard to the light beam and the microscope objective to give the maximum value. A study of the table will show that the values obtained are distinctly comparable to that obtained with ordinary glass.

While this invention has particular application to polymethylmethacrylate lenses it is by no means so limited and may be employed wherever it is desired to enhance the scratch resistance of a soft substrate. Such protection may well be extended to such structures as windshields, windows or to produce an abrasion-resistant front-surface mirror coating for rear view mirrors where a moderately bright reflected image is desired.

We claim as our invention:

1. An optical element having a resistance to scratching and mechanical abrasion of the same order as glass and comprising a massive substrate which is materially softer than glass, a layer of germanium adjacent the soft substrate and a layer of an oxide of silicon superimposed upon the germanium layer.

2. An optical element having a resistance to scratching and mechanical abrasion of the same order as glass and comprising a massive substrate which is materially softer than glass, a layer of germanium adjacent the soft substrate and having a thickness up to 1000 Angstrom units and a layer of an oxide of silicon having a thickness of up to 20,000 Angstrom units superimposed upon the germanium layer.

3. An optical element having a resistance to scratching and mechanical abrasion of the same order as glass and comprising a massive substrate which is materially softer than glass, a layer of germanium adjacent the soft substrate and having a thickness of 100 to 1000 Angstrom units and a layer of an oxide of silicon having a thickness of 2500 to 5000 Angstrom units superimposed upon the germanium layer.

4. An optical element having a resistance to scratching and mechanical abrasion of the same order as glass and comprising a massive substrate of a polymethylmethacrylate plastic, a layer of germanium adjacent the substrate, and a layer of an oxide of silicon superimposed upon the germanium layer.

5. An optical element having a resistance to scratching and mechanical abrasion of the same order as glass and comprising a massive substrate of polymethylmethacrylate plastic, a layer of germanium adjacent the substrate and having a thickness up to 1000 Angstrom units and a layer of an oxide of silicon having a thickness of up to 20,000 Angstrom units superimposed upon the germanium layer.

6. An optical element having a resistance to scratching and mechanical abrasion of the same order as glass and comprising a massive substrate of polymethylmethacrylate plastic, a layer of germanium adjacent the substrate and having a thickness of 100 to 1000 Angstrom units and a layer of an oxide of silicon having a thickness of 2500 to 5000 Angstrom units superimposed upon the germanium layer.

7. An optical element having a resistance to scratching of the same order as glass and comprising a massive substrate of polymethylmethacrylate plastic, an effectively thick layer of germanium adjacent the substrate and having a thickness up to 1000 Angstrom units and an effectively thick layer of an oxide of silicon having a thickness of up to 20,000 Angstrom units superimposed upon the germanium layer.

8. An optical element having a resistance to scratching of the same order as glass and comprising a massive substrate which is materially softer than glass, an effectively thick layer of germanium adjacent the soft substrate and having a thickness up to 1000 Angstrom units and an effectively thick layer of an oxide of silicon superimposed upon the germanium layer and having a thickness of up to 20,000 Angstrom units.

9. An optical element having a resistance to scratching and mechanical abrasion of the same order as glass and comprising a massive substrate which is materially softer than glass, an adherent layer of germanium adjacent the soft substrate and an adherent layer of an oxide of silicon superimposed upon the germanium layer.

No references cited.